No. 644,229. Patented Feb. 27, 1900.
J. H. HEBLETHWAITE.
TRUCK.
(Application filed Aug. 30, 1899.)
(No Model.)
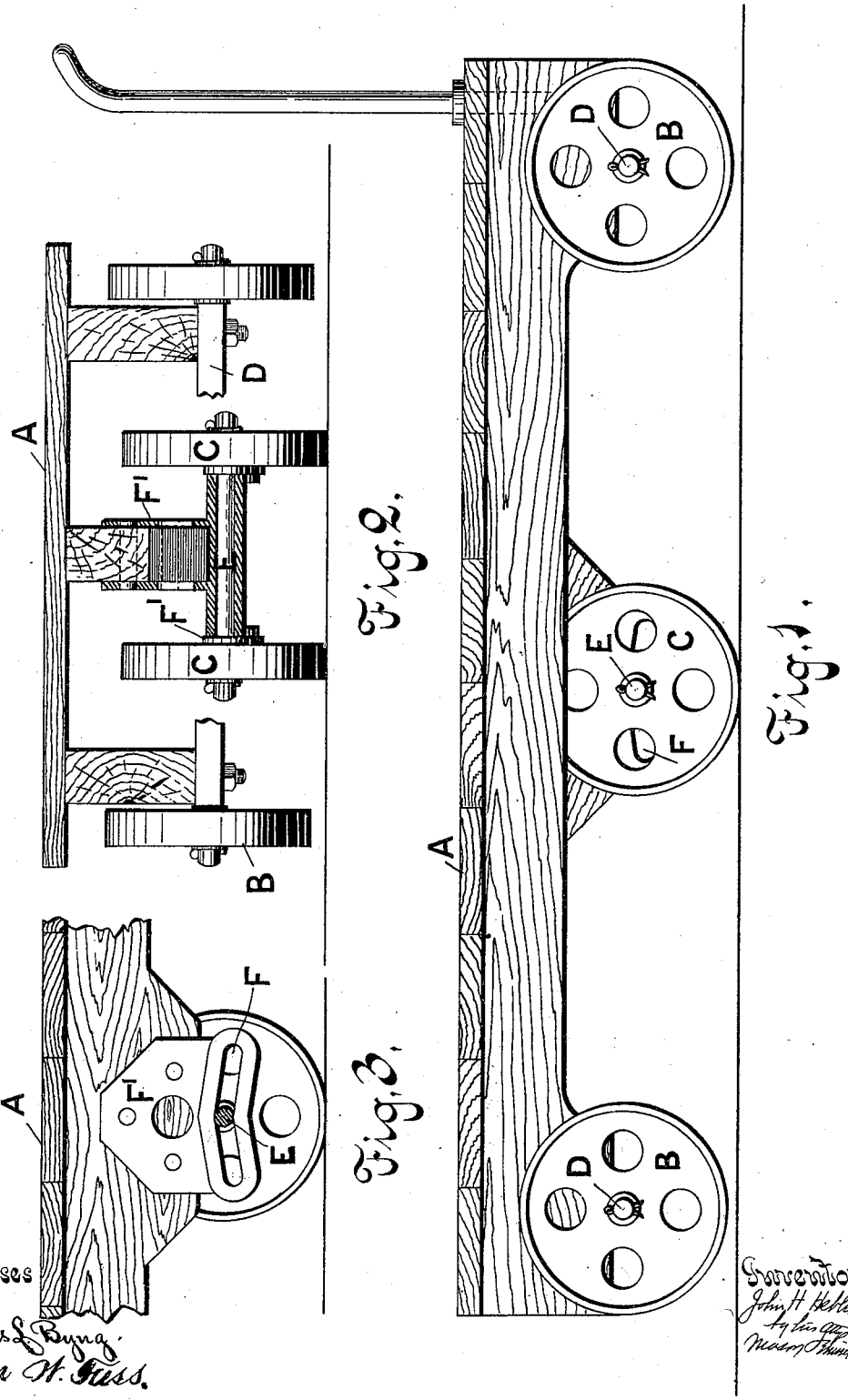

UNITED STATES PATENT OFFICE.

JOHN HERBERT HEBLETHWAITE, OF HOYLAKE, ENGLAND.

TRUCK.

SPECIFICATION forming part of Letters Patent No. 644,229, dated February 27, 1900.

Application filed August 30, 1899. Serial No. 729,002. (No model.)

*To all whom it may concern:*

Be it known that I, JOHN HERBERT HEBLETHWAITE, a subject of the Queen of Great Britain, residing at Hoylake, in the county of Chester, England, (whose post-office address is Glena Cottage, Meols Drive, Hoylake,) have invented certain new and useful Improvements in Trucks, of which the following is a specification.

This invention relates to trucks or carriages for carrying heavy or other loads on the floors of warehouses, station-platforms, or other places having fairly-even surfaces, and is designed to provide certain improvements, which will now be described.

Figure 1 is a side elevation of the improved truck. Fig. 2 is a cross-section through the truck in front of the center wheels, the end axle behind them being broken away at the center. Fig. 3 is a detail view in section, the section being taken to one side of the center-wheel-carrying frame and between the said frame and one of the wheels.

The truck comprises a platform or bottom A, of wood or other suitable material, either with or without stand-up sides or ends and provided with a pair of wheels B near each end and an additional pair of wheels C on a short axle E near the center. The wheels at the ends are mounted on axles D, which always remain in one uniform position. The pair of wheels C are so arranged that the whole truck can be balanced and turned on them without friction, thus acting as a center axis, the wheels B at ends being in the meantime held clear of the ground, and thus the load is balanced on the center wheels and the truck will revolve on its axis. In Figs. 1 and 3 the axle E of the center wheels C is mounted at each end in the slots F of the casting F' so that it will slide or roll therein, which slots are by preference curved downward toward the ends, so that when in motion the axle of the wheels is at either end of the slots, depending on the direction in which the truck is proceeding. When truck is at a standstill, the force of gravity causes center axle to roll automatically to center of slots, thus balancing weight and bringing truck into position for revolving.

In use the truck will ride on the center wheels and one pair of wheels only, at one end or the other, according to the direction in which the truck is pulled or pushed. In pushing or pulling the truck along the center wheels will of course move into what is for the time being the rear end of the slot F or spindle G, thus extending the carrying-base and giving much more stability. The slots or spindle may be of any length. The shorter the truck the more apparent becomes the utility of the sliding axle. In thus describing my invention, however, I wish it to be understood that I do not confine myself to mounting the center wheels in the curved slots F, as these wheels may be mounted in straight slots, if desired.

I declare that what I claim is—

1. In a truck, the combination with a suitable frame, of wheels arranged on each end thereof, a shaft-carrying frame secured to the center of the truck, a movable shaft mounted in the said frame, and loosely-mounted independent wheels upon the said shaft, the structure being such that the truck may be readily turned upon the center wheels and yet the wheels will so accommodate themselves to the movement of the truck as to support the frame with a broad load-carrying base, substantially as described.

2. In a truck, the combination with a suitable frame, of wheels secured to each end thereof, a frame secured beneath the central portion of the truck and having slotted brackets secured thereto, a shaft having wheels mounted upon each end thereof and engaging the slots in the said brackets, the construction being such that when the truck is moving in one direction the axles of the central wheels will move to one end of the slots in the brackets and when the truck is moving in the other direction the said axles will move to the other end of the said slots, substantially as described.

3. In a truck, the combination with a suitable frame having wheels under each end of the frame, of a casting or frame secured beneath the center of the said truck, brackets secured to said frame and having slots formed therein, the said slots being preferably lower at each end than at the middle, a short shaft engaging the said slots and carrying wheels at its ends, the construction being such that when the truck is pulled in one direction the short shaft will move to one end of the slots in the brackets and when the truck is moved in the other direction the said shaft will move to the other end of said slots, and when the truck is stationary the said shaft will move to the highest point in said slots, substantially as described.

4. In a truck, the combination with a suitable frame, of axles secured to each end thereof carrying supporting-wheels, a casting or frame secured beneath the central portion of said truck and provided with longitudinally-extending brackets having slots formed therein, the said slots being inclined downwardly at their ends, a short shaft carrying a pair of supporting-wheels and engaging the slots in the said brackets, whereby the shaft carrying the central wheels will move to the ends of the said slots when the truck is being moved back and forth and when it is stationary the said short shaft will assume a central position so that the truck can be easily turned upon the same, substantially as described.

In witness whereof I have hereunto signed my name, this 8th day of August, 1899, in the presence of two subscribing witnesses.

J. HERBERT HEBLETHWAITE.

Witnesses:
G. C. DYMOND,
J. MCLACHLAN.